United States Patent

Shimada et al.

[11] Patent Number: 5,774,250
[45] Date of Patent: Jun. 30, 1998

[54] OPTICAL CONDENSER SYSTEM FOR LIGHT SCANNING APPARATUS

[75] Inventors: Katsumi Shimada; Osamu Kuroda, both of Kanagawa-ken, Japan

[73] Assignee: Fuji Photo Film Co., Ltd., Kanagawa, Japan

[21] Appl. No.: 839,156

[22] Filed: Apr. 23, 1997

[30] Foreign Application Priority Data

Apr. 24, 1996 [JP] Japan .................................. 8-102155

[51] Int. Cl.$^6$ .................................................. G02B 26/08
[52] U.S. Cl. ........................ 359/205; 359/206; 359/207; 359/216; 359/662; 359/793
[58] Field of Search .................................. 359/205–207, 359/216–219, 662, 708, 710, 711, 717, 718, 793–795; 347/258–261

[56] References Cited

U.S. PATENT DOCUMENTS 5,541,760  7/1996  Iizuka ...................................... 359/206

*Primary Examiner*—James Phan
*Attorney, Agent, or Firm*—Sughrue, Mion, Zinn, Macpeak & Seas, PLLC

[57] ABSTRACT

An optical condenser system for a light scanning apparatus includes a first lens which is a single lens formed of plastic and a second lens which is a plano-convex lens formed of glass and convex toward the scanning surface. The first lens is concave toward a deflector of the light scanning apparatus and each side of the first lens is an aspheric surface defined by the following formula (6). The first and second lens satisfying the following formulae (1) to (5)

$$0.1f \leq d_0 \leq 0.3f \quad (1)$$

$$0.02f \leq d_2 \leq 0.2f \quad (2)$$

$$-1.0 \times 10^2/f^3 \leq a_1 \leq -1.0/f^3 \quad (3)$$

$$5.0 \times 10/f^5 \leq a_2 \leq 5.0 \times 10^3/f^5 \quad (4)$$

$$-0.3f \leq 1/f_1 \leq 0.3f \quad (5)$$

$$z = ch^2/[1 + \{1-(1+K)c^2h^2\}^{1/2}] + a_1 h^4 + a_2 h^6 + a_3 h^8 + a_4 h^{10} \quad (6)$$

wherein f represents the focal length (mm) of the whole system, $d_0$ represents the axial surface separation (mm) between the deflecting point at the deflector and the first lens, $d_2$ represents the axial surface separation (mm) between the first lens and the second lens and $f_1$ represents the focal length (mm) of the first lens.

1 Claim, 8 Drawing Sheets

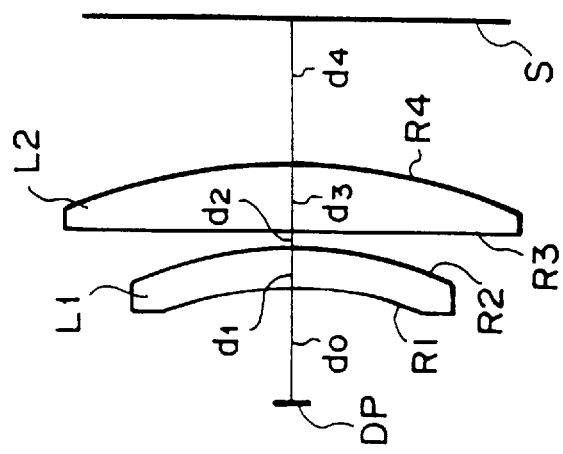
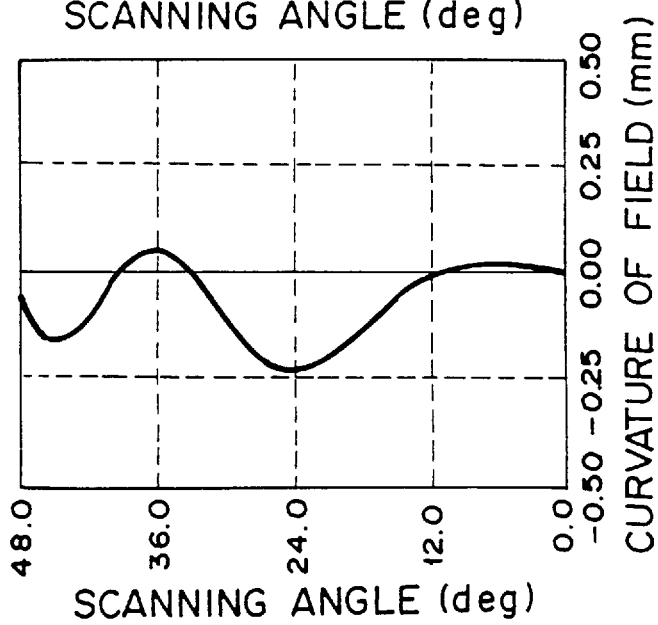
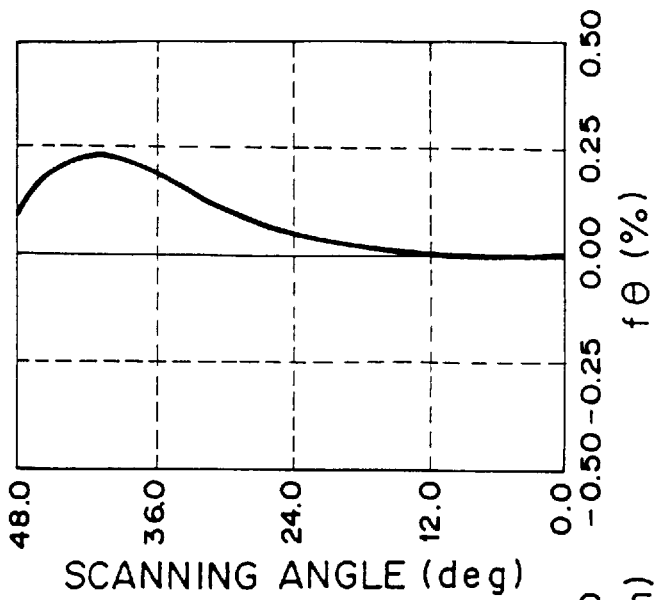

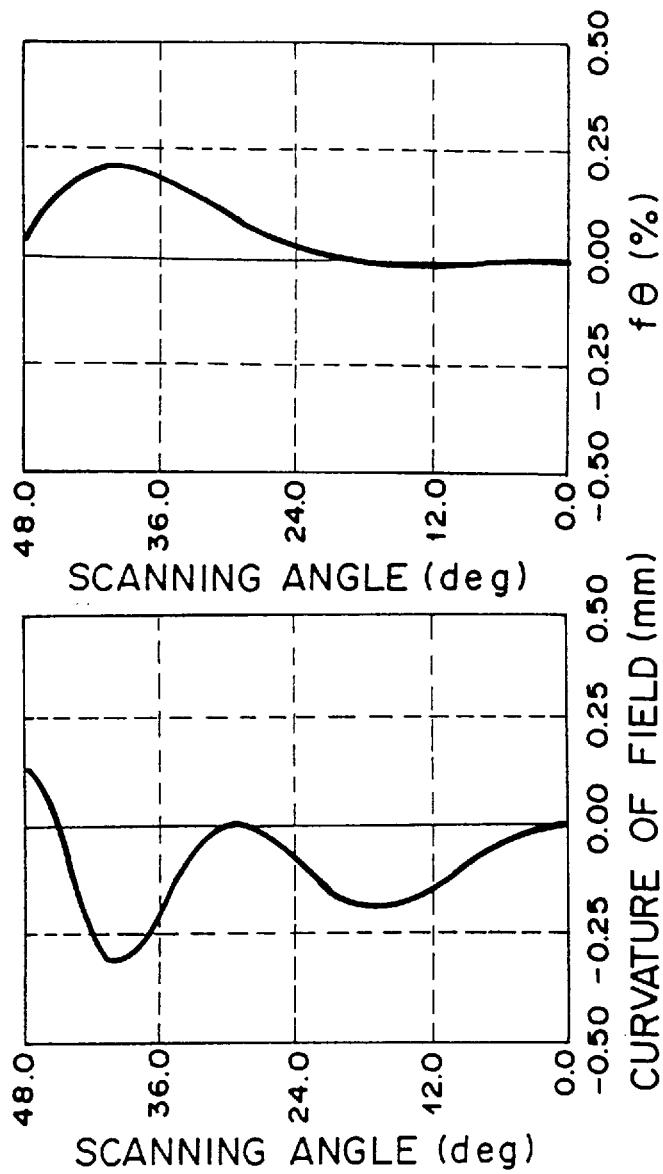

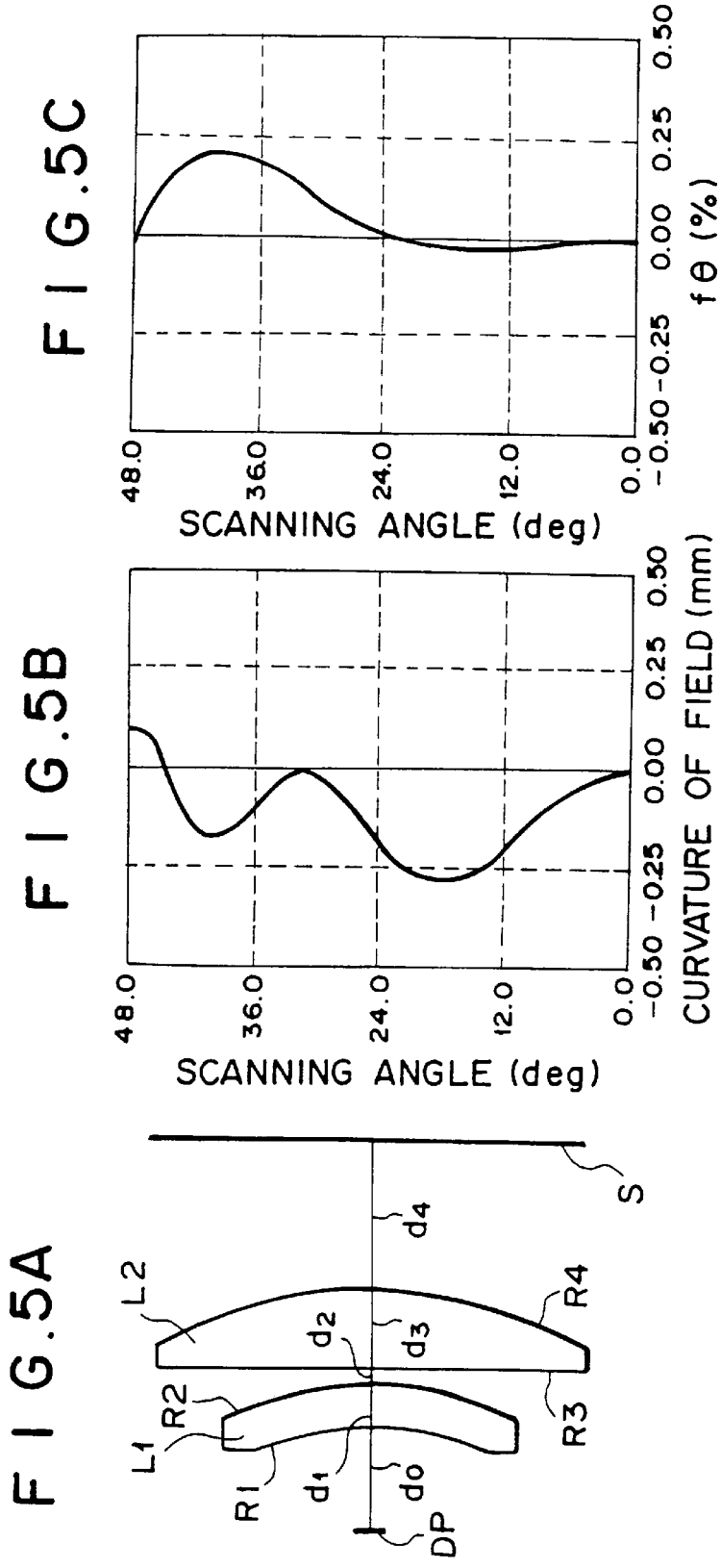

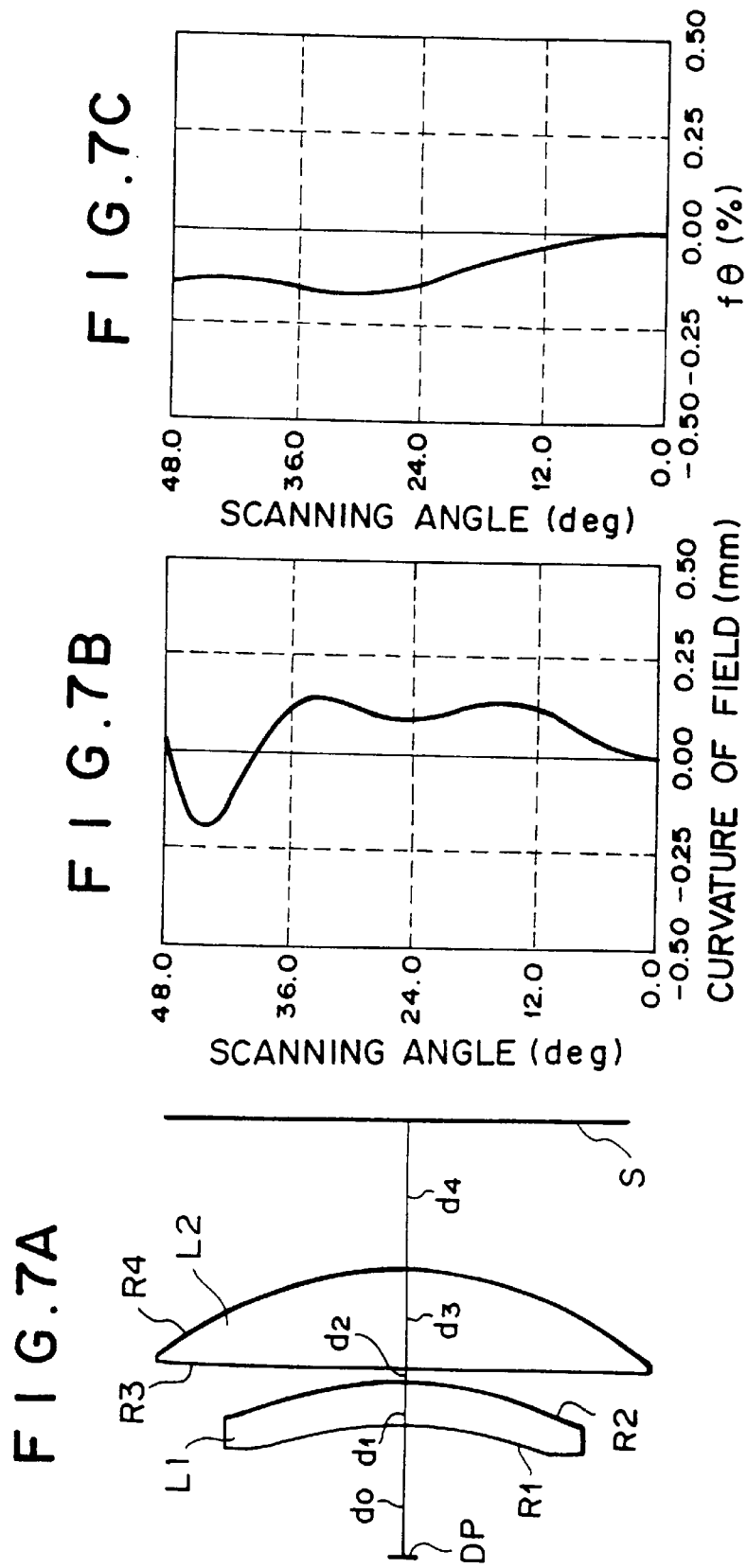

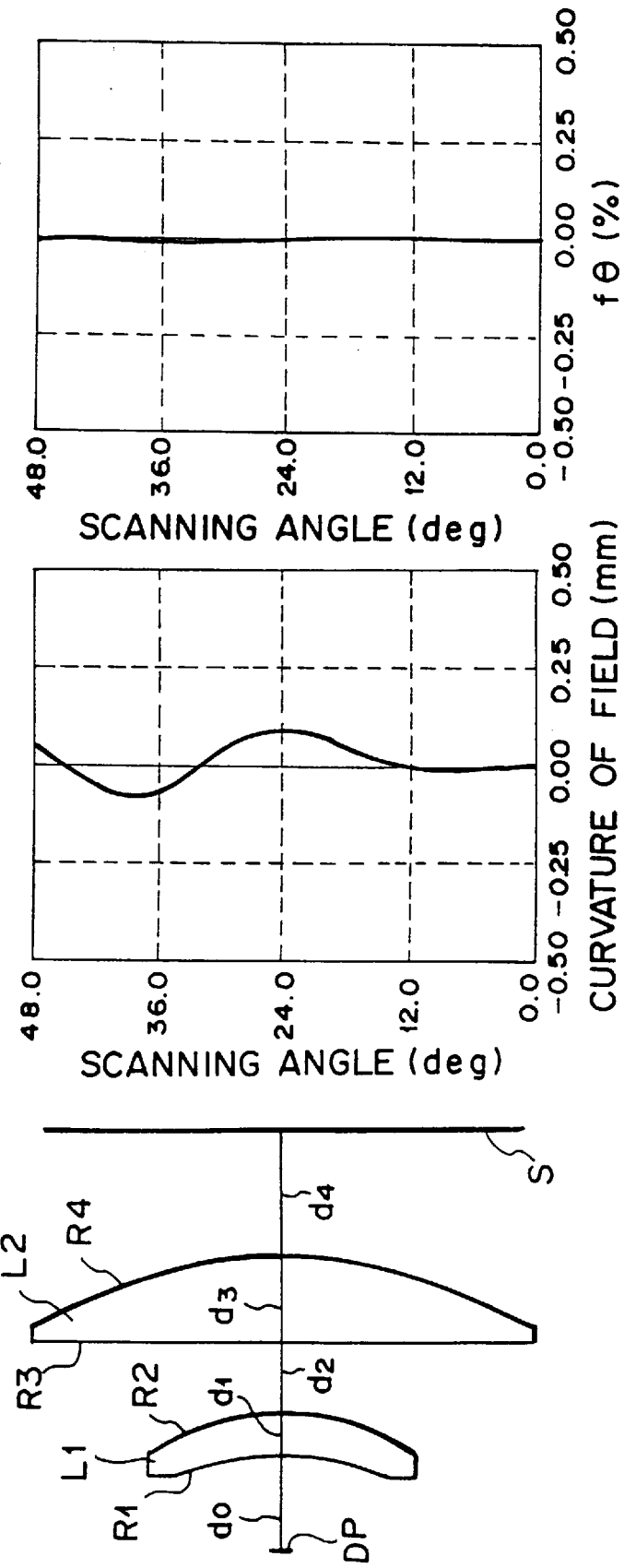

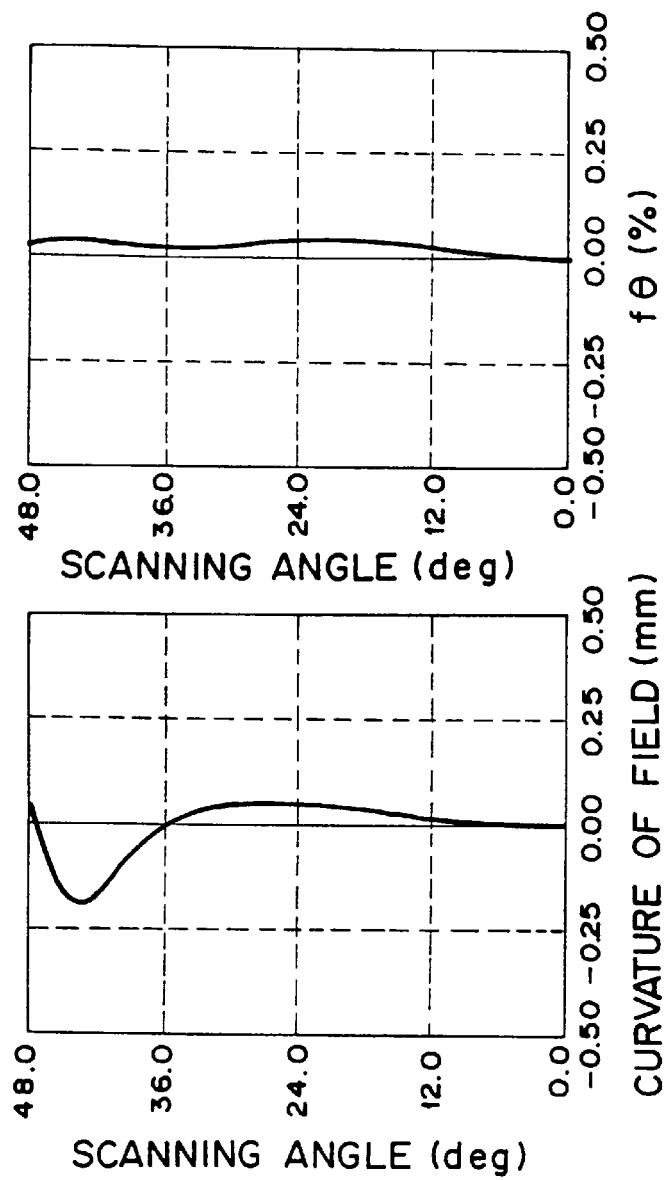

OPTICAL CONDENSER SYSTEM FOR LIGHT SCANNING APPARATUS

BACKGROUND OF THE INVENTION

1. Field of the Invention This invention relates to an optical condenser system for use in a light scanning apparatus which deflects a light bundle such as a laser beam to scan a predetermined surface.

2. Description of the Related Art

There has been known a light scanning apparatus in which a light beam is deflected by a deflector such as a polygonal mirror, a galvanometer scanner or the like to scan a predetermined surface.

Such a light scanning apparatus is used, for instance, in a laser beam printer and generally comprises a light source for emitting a laser beam or the like, a deflector which deflects a light bundle emitted from the light source, and an optical condenser system which causes the deflected light bundle to form an image on a predetermined scanning surface and makes the height of the image proportional to the deflecting angle of the deflector.

The optical condenser system is required to be excellent in aberration and fθ characteristics.

However when such a requirement is simply satisfied, the cost of the optical condenser system will become too high and the size of the same will become too large for practical use.

In order to obtain an optical system having excellent aberration characteristics without increasing the manufacturing cost, the system disclosed, for instance, in Japanese Patent Publication No. 7(1995)-60221, a scanning lens system is formed by a single plastic lens which is aspheric in both faces. The single plastic lens has excellent aberration characteristics though small in size.

However kinds of materials of plastic lenses are smaller as compared with those of glass lenses, and plastic lenses are generally smaller in refractive index as compared with glass lenses. Accordingly, in Japanese Patent Publication No. 7(1995)-60221, the radius of curvature of the lens is made small in order to increase refracting power thereof.

However a small radius of curvature results in increase in the ratio of the thickness of the central portion to that of the peripheral portion, which results in deterioration in manufacturing accuracy and increase in manufacturing time.

Further plastic materials are generally more sensitive to change in environment and more apt to be affected by temperature and humidity than glass material. Accordingly in the case of plastic lenses, the focal length changes with change in temperature and/or humidity and the change in focal length is larger as the refracting power of the lens increases.

SUMMARY OF THE INVENTION

In view of the foregoing observations and description, the primary object of the present invention is to provide an optical condenser system for a light scanning apparatus which is less sensitive to change of the environment, easy to manufacture and excellent in aberration characteristics and fθ characteristics.

The optical condenser system in accordance with the present invention is for a light scanning apparatus for focusing a light bundle such as a laser beam deflected by a deflector such as a polygonal mirror on a predetermined scanning surface and causing the light bundle to scan the scanning surface at a constant speed and comprises a first lens consisting of a single lens formed of plastic, the single lens being concave toward the deflector and each side of the single lens being an aspheric surface defined by the following formula (6), and a second lens consisting of a plano-convex lens which is formed of glass and is convex toward the scanning surface in a cross-section taken along a plane along which the light bundle passing through the second lens is moved as a result of deflection by the deflector, the first and second lens satisfying the following formulae (1) to (5)

$$0.1f \leq fd_0 \leq 0.3f \quad (1)$$

$$0.02f \leq d_2 \leq 0.2f \quad (2)$$

$$-1.0 \times 10^2/f^3 \leq a_1 \leq -1.0/f^3 \quad (3)$$

$$5.0 \times 10/f^5 \leq a_2 \leq 5.0 \times 10^3/f^5 \quad (4)$$

$$-0.3f \leq 1/f_1 \leq 0.3f \quad (5)$$

$$z = ch^2/[1+\{1-(1+K)c^2h^2\}^{1/2}] + a_1 h^4 + a_2 h^6 + a_3 h^8 + a_4 h^{10} \quad (6)$$

wherein f represents the focal length (mm) of the whole system, $d_0$ represents the axial surface separation (mm) between the deflecting point at the deflector and the first lens, $d_2$ represents the axial surface separation (mm) between the first lens and the second lens, $f_1$ represents the focal length (mm) of the first lens, $a_1$ to $a_4$ respectively represent fourth-degree, sixth-degree, eighth-degree and tenth-degree aspheric coefficients, z represents the sag of the surface parallel to the z-axis, h represents the height above the optical axis, c represents the curvature at the pole of the surface (the reciprocal of the radius of curvature R on the optical axis: 1/R), K represents a conic constant.

It is preferred that the first lens be symmetric about its optical axis in order to ensure easy processing.

When the axial surface separation $d_0$ between the deflecting point at the deflector and the first lens is smaller than the lower limit in formula (1), the curvature of field becomes large in the negative direction (insufficient correction), and when the axial surface separation $d_0$ is larger than the upper limit, the curvature of field becomes large in the positive direction (over-correction) and at the same time the length of the optical system in the optical axis is increased, thereby increasing the overall size of the light scanning apparatus.

An axial surface separation $d_2$ between the first lens and the second lens smaller than the lower limit in formula (2) produces the same outcome as that produced by an axial surface separation $d_0$ smaller than the lower limit in formula (1). An axial surface separation $d_2$ larger than the upper limit in formula (2) produces the same outcome as that produced by an axial surface separation $d_0$ larger than the upper limit in formula (1).

When the fourth-degree aspheric coefficient $a_1$ is smaller than the lower limit in formula (3), both the curvature of field and the fθ characteristics become too large in the positive direction to correct, and when the fourth-degree aspheric coefficient $a_1$ is larger than the upper limit in formula (3), both the curvature of field and the fθ characteristics become too large in the negative direction to correct.

A sixth-degree aspheric coefficient $a_2$ smaller than the lower limit in formula (4) produces the same outcome as that produced by a fourth-degree aspheric coefficient $a_1$ smaller than the lower limit in formula (3). A sixth-degree aspheric coefficient $a_2$ larger than the upper limit in formula (4)

produces the same outcome as that produced by a sixth-degree aspheric coefficient $a_2$ larger than the upper limit in formula (3).

Formula (5) is for suppressing deterioration in performance of the plastic lens due to change of the temperature. When $1/f_1$ is not in the range defined by formula (5), shift of the focus on the scanning surface becomes too large.

In the optical condenser system in accordance with the present invention, by combination of a plastic lens (the first lens) and a glass lens (the second lens), the refracting power of the plastic lens can be reduced, whereby the ratio of the thickness of the central portion to that of the peripheral portion need not be so large and the processability can be improved.

Further by reducing the power of the plastic lens, the plastic lens becomes less sensitive to change in environment and accordingly change of the position of the focus with change in environmental temperature and/or humidity can be suppressed.

Further, limiting the axial surface separations between the deflecting point and the first lens and between the first and second lenses keeps small the size of the optical condenser system of the present invention and makes excellent the aberration characteristics and the fθ characteristics coupled with limitation of the aspheric coefficients and suppression of the power of the plastic lens.

BRIEF DESCRIPTION OF THE DRAWINGS

FIG. 3A is a schematic view showing the arrangement of the optical condenser system in accordance with a second embodiment of the present invention, FIG. 3B is a graph showing the curvature of field of the optical condenser system of the second embodiment, FIG. 3C is a graph showing the fθ characteristics of the optical condenser system of the second embodiment, FIG. 4A is a schematic view showing the arrangement of the optical condenser system in accordance with a third embodiment of the present invention, FIG. 4B is a graph showing the curvature of field of the optical condenser system of the third embodiment, FIG. 4C is a graph showing the fθ characteristics of the optical condenser system of the third embodiment, FIG. 5A is a schematic view showing the arrangement of the optical condenser system in accordance with a fourth embodiment of the present invention, FIG. 5B is a graph showing the curvature of field of the optical condenser system of the fourth embodiment, FIG. 5C is a graph showing the fθ characteristics of the optical condenser system of the fourth embodiment, FIG. 7A is a schematic view showing the arrangement of the optical condenser system in accordance with a sixth embodiment of the present invention, FIG. 7B is a graph showing the curvature of field of the optical condenser system of the sixth embodiment, FIG. 7C is a graph showing the fθ characteristics of the optical condenser system of the sixth embodiment, FIG. 8A is a schematic view showing the arrangement of the optical condenser system in accordance with a seventh embodiment of the present invention, FIG. 8B is a graph showing the curvature of field of the optical condenser system of the seventh embodiment, FIG. 8C is a graph showing the fθ characteristics of the optical condenser system of the seventh embodiment, FIG. 9A is a schematic view showing the arrangement of the optical condenser system in accordance with an eighth embodiment of the present invention, FIG. 9B is a graph showing the curvature of field of the optical condenser system of the eighth embodiment, and FIG. 9C is a graph showing the fθ characteristics of the optical condenser system of the eighth embodiment.

DESCRIPTION OF THE PREFERRED EMBODIMENT

Figure 1:
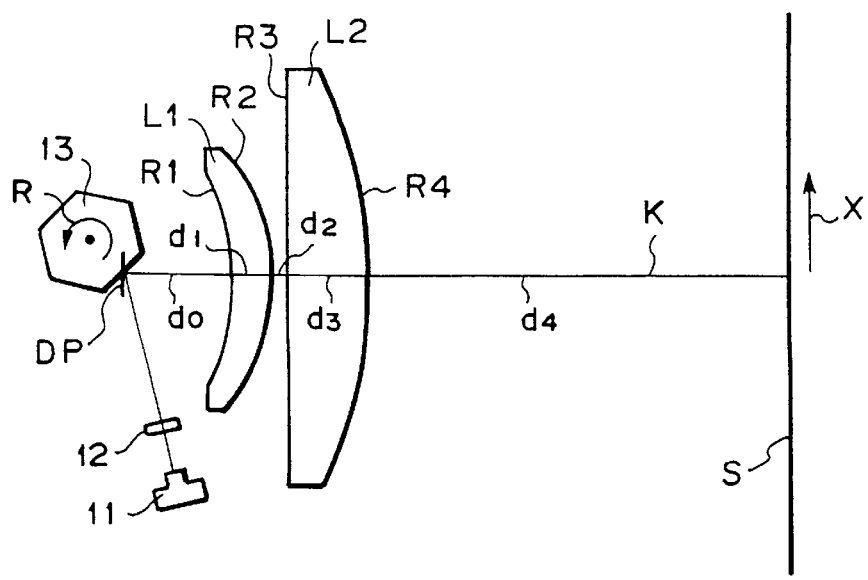
FIG. 1 is a cross-sectional view of a light scanning apparatus employing an optical condenser system in accordance with a first embodiment of the present invention taken along a plane along which a light bundle is moved as a result of deflection by the deflector.

In FIG. 1, a light scanning apparatus comprises a laser 11 emitting a laser beam, a cylindrical lens 12 which is convex to the laser 11 and forms a line image of the laser beam on a reflecting surface of a polygonal mirror 13 which is rotated by an electric motor (not shown) to deflect the laser beam, and an optical condenser system in accordance with a first embodiment of the present invention which focuses the laser beam deflected by the polygonal mirror 13 on a predetermined scanning surface S and causes the laser beam to scan the scanning surface S at a constant speed. In FIG. 1, DP denotes a deflecting point.

The optical condenser system of the first embodiment comprises a first lens L1 which is a single lens formed of plastic and a second lens L2 which is a plano-convex lens formed of glass. The first lens L1 is concave toward the polygonal mirror 13 and each side of the first lens L1 is an aspheric surface defined by the following formula (6). The second lens L2 is convex toward the scanning surface S in a cross-section (shown in FIG. 1) taken along a plane along which the laser beam passing through the second lens L2 is moved as a result of deflection by the polygonal mirror 13.

The optical condenser system satisfies the following formulae (1) to (5).

$$0.1f \leq fd_0 \leq 0.3f \tag{1}$$

$$0.02f \leq d_2 \leq 0.2f \tag{2}$$

$$-1.0 \times 10^2/f^3 \leq a_1 \leq -1.0/f^3 \tag{3}$$

$$5.0 \times 10/f^5 \leq a_2 \leq 5.0 \times 10^3/f^5 \tag{4}$$

$$-0.3f \leq 1/f_1 \leq 0.3f \tag{5}$$

$$z = ch^2/[1 + \{1-(1+K)c^2h^2\}^{1/2}] + a_1h^4 + a_2h^6 + a_3h^8 + a_4h^{10} \tag{6}$$

wherein f represents the focal length (mm) of the whole system, $d_0$ represents the axial surface separation (mm) between the deflecting point at the polygonal mirror 13 and the first lens L1, $d_2$ represents the axial surface separation (mm) between the first lens L1 and the second lens L2, $f_1$ represents the focal length (mm) of the first lens L1, $a_1$ to $a_4$ respectively represent fourth-degree, sixth-degree, eighth-degree and tenth-degree aspheric coefficients, z represents the sag of the surface parallel to the z-axis, h represents the height above the optical axis, c represents the curvature at the pole of the surface (the reciprocal of the radius of curvature R on the optical axis: 1/R), K represents a conic constant. The fourth-degree aspheric coefficient $a_1$ and the sixth-degree aspheric coefficient $a_2$ for the surface of the first lens L1 facing the polygonal mirror 13 may be either equal to or different from those for the surface of the first lens L1 facing the second lens L2.

The radii of curvature R (mm) of the refracting surfaces, the axial surface separation $d_0$ (mm) between the deflecting point at the polygonal mirror 13 and the first lens L1, the central thickness d1 of the first lens L, the axial surface separation $d_2$ (mm) between the first lens L1 and the second lens L2, the central thickness $d_3$ (mm) of the second lens L2, the axial surface separation $d_4$ (mm) between the second lens L2 and the scanning surface S, and the refractive indexes $n_1$ and $n_2$ for the sodium d-line of the first and second lenses L1 and L2 of the optical condenser system of the first embodiment are as shown in the following table 1.

In table 1 and the tables to be described later, the radius of curvature R is positive when the surface is convex toward the deflecting point and is negative when the surface is convex toward the scanning surface S, the value designated by * represents the radius of curvature on the optical axis (at the vertex of an aspheric surface) and means that the aspheric surface has a shape defined by formula (6).

TABLE 1

| curvature | surface separation | refractive index |
|---|---|---|
| R1 = −57.885 * | $d_0$ = 18.04 | |
| K = 5.7242 | | |
| $a_1$ = −1.337 × $10^{-5}$ | | |
| $a_2$ = 4.558 × $10^{-5}$ | | |
| $a_3$ = −6.956 × $10^{-11}$ | | |
| $a_4$ = 4.694 × $10^{-14}$ | $d_1$ = 7.146 | $n_1$ = 1.52540 |
| R2 = −45.773 * | | |
| K = 2.2116 | | |
| $a_1$ = −6.319 × $10^{-6}$ | | |
| $a_2$ = 1.173 × $10^{-8}$ | | |
| $a_3$ = −6.785 × $10^{-12}$ | | |
| | $d_2$ = 2.382 | |
| $a_4$ = 2.175 × $10^{-15}$ | | |
| R3 = ∞ | | |
| | $d_3$ = 14.293 | $n_2$ = 1.62004 |
| $R_4$ = −87.264 | | |
| | $d_4$ = 100.999 | | f = 100 mm  angle of view = 96°
$f_1$ = 346.95 mm
curvature of field = 0.15 mm
fθ = 0.16%

In the optical condenser system of this embodiment, the value of $1/f_1$ is close to the upper limit defined by formula (5).

The operation of the optical condenser system of this embodiment will be described, hereinbelow.

A laser beam is emitted from the laser 11 and a line image of the laser beam is formed on the deflecting surface of the polygonal mirror 13 by the cylindrical lens 12.

After reflected by the deflecting surface of the polygonal mirror 13, the laser beam travels through the first and second lenses L1 and L2 and is focused on the scanning surface S to form a scanning spot. Since the polygonal mirror 13 is rotated in the direction of arrow R at a high speed, the scanning spot repeatedly scan the scanning surface S in the direction of arrow X (main scanning).

When a photosensitive material or the like is disposed on the scanning surface S and the photosensitive material is fed at a constant speed in the direction perpendicular to arrow X (sub-scanning), the scanning spot two-dimensionally scans the photosensitive material.

Figure 2A:
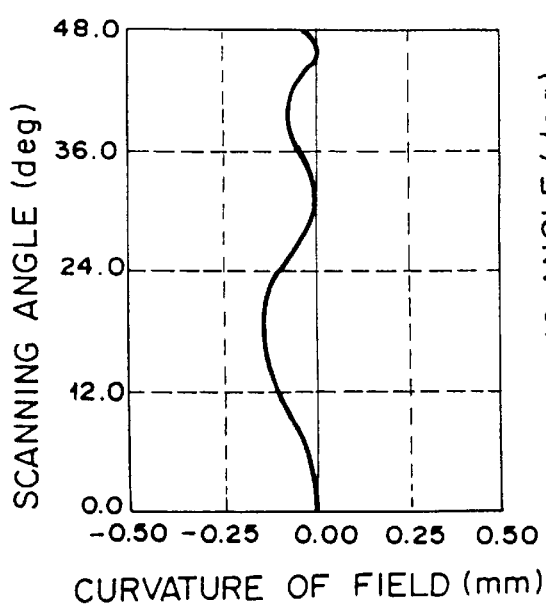
FIG. 2A is a graph showing the curvature of field of the optical condenser system of the first embodiment.
Figure 2B:
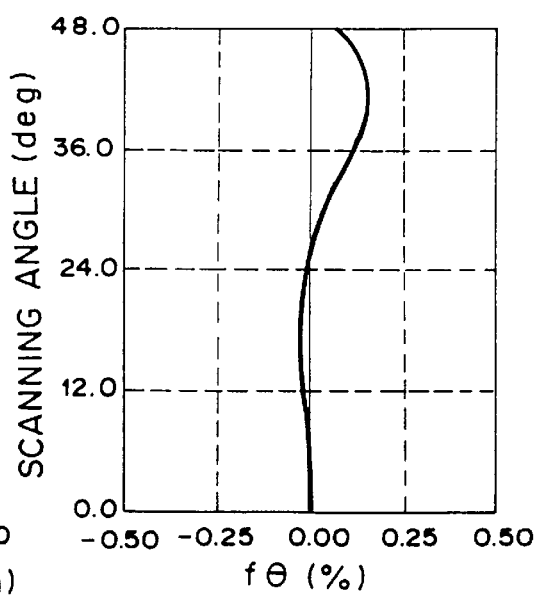
FIG. 2B is a graph showing the fθ characteristics of the optical condenser system of the first embodiment.

FIGS. 2A and 2B respectively show curvature of field and fθ characteristics of the optical condenser system of this embodiment.

As can be understood from FIGS. 2A and 2B, in the optical condenser system of this embodiment, aberrations are well corrected and also the fθ characteristics are excellent.

Thus in the optical condenser system of this embodiment, a plastic lens (the first lens) and a glass lens (the second lens) are combined and the refracting power of the plastic lens is limited in the range defined by formula (5). Accordingly the ratio of the thickness of the central portion to that of the peripheral portion of the plastic lens need not be so large, whereby the processability can be improved and at the same time change of the position of the focus with change in environmental temperature and the like can be suppressed.

Further, by limiting the axial surface separations between the deflecting point and the first lens and between the first and second lenses to the ranges defined by formulae (1) and (2), the size of the optical condenser system in the direction of the optical axis can be kept small, whereby the overall size of the light scanning apparatus can be small.

Optical condenser systems in accordance with second to eighth embodiments of the present invention will be described with reference to tables 2 to 8 and FIGS. 3 (3A to 3C) to 9 (9A to 9C), hereinbelow.

As shown in FIGS. 3A, 4A, 5A, 6A, 7A, 8A and 9A, each of the second to eighth embodiments is the same as the first embodiment in the basic arrangement and satisfies all the conditions defined by the aforesaid formulae (1) to (5).

The second to fourth embodiments differ from each other mainly in the refractive index of the glass lens (the second lens L2).

TABLE 2

| curvature | surface separation | refractive index |
|---|---|---|
| R1 = −62.593* | $d_0$ = 18.112 | |
| K = 0.0 | | |
| $a_1$ = −1.471 × $10^{-5}$ | | |
| $a_2$ = 5.504 × $10^{-8}$ | | |
| $a_3$ = −6.483 × $10^{-11}$ | | |
| $a_4$ = 2.489 × $10^{-14}$ | $d_1$ = 6.673 | $n_1$ = 1.52540 |
| R2 = −58.616* | | |
| K = 0.0 | | |
| $a_1$ = −7.565 × $10^{-6}$ | | |
| $a_2$ = 1.583 × $10^{-8}$ | | |
| $a_3$ = −3.708 × $10^{-12}$ | | |
| | $d_2$ = 2.383 | |
| $a_4$ = −4.175 × $10^{-15}$ | | |
| R3 = ∞ | | |
| | $d_3$ = 10.486 | $n_2$ = 1.80518 |
| $R_4$ = −90.362 | | |
| | $d_4$ = 102.886 | | f = 100 mm  angle of view = 96°
$f_1$ = 1065.93 mm
curvature of field = 0.29 mm
fθ = 0.23%

TABLE 3

| curvature | surface separation | refractive index |
| --- | --- | --- |
| R1 = −68.545* | $d_0$ = 18.105 | |
| K = 6.7659 | | |
| $a_1$ = −1.140 × $10^{-5}$ | | |
| $a_2$ = 5.431 × $10^{-8}$ | | |
| $a_3$ = −9.412 × $10^{-11}$ | | |
| $a_4$ = 8.097 × $10^{-14}$ | $d_1$ = 7.147 | $n_1$ = 1.52540 |
| R2 = −68.391* | | |
| K = 3.3569 | | |
| $a_1$ = −5.945 × $10^{-6}$ | | |
| $a_2$ = 1.745 × $10^{-8}$ | | |
| $a_3$ = −1.700 × $10^{-11}$ | | |
| | $d_2$ = 2.382 | |
| $a_4$ = 8.582 × $10^{-15}$ | | |
| R3 = ∞ | | |
| | $d_3$ = 18.582 | $n_2$ = 1.51680 |
| $R_4$ = −54.638 | | |
| | $d_4$ = 103.152 | |
| f = 100 mm | | angle of view = 96° |
| $f_1$ = 3442.37 mm | | |
| curvature of field = 0.45 mm | | |
| fθ = 0.21% | | |

TABLE 4

| curvature | surface separation | refractive index |
| --- | --- | --- |
| R1 = −54.063* | $d_0$ = 18.103 | |
| K = 3.7576 | | |
| $a_1$ = −9.130 × $10^{-6}$ | | |
| $a_2$ = 6.334 × $10^{-8}$ | | |
| $a_3$ = −1.036 × $10^{-10}$ | | |
| $a_4$ = 8.425 × $10^{-14}$ | $d_1$ = 7.146 | $n_1$ = 1.52540 |
| R2 = −55.445* | | |
| K = 0.5360 | | |
| $a_1$ = −5.699 × $10^{-6}$ | | |
| $a_2$ = 1.836 × $10^{-8}$ | | |
| $a_3$ = −1.494 × $10^{-11}$ | | |
| | $d_2$ = 2.382 | |
| $a_4$ = 4.568 × $10^{-15}$ | | |
| R3 = ∞ | | |
| | $d_3$ = 13.339 | $n_2$ = 1.68893 |
| $R_4$ = −72.562 | | |
| | $d_4$ = 104.344 | |
| f = 100 mm | | angle of view = 96° |
| $f_1$ = 5360.18 mm | | |
| curvature of field = 0.37 mm | | |
| fθ = 0.21% | | |

As can be understood from FIGS. 3B, 3C, 4B, 4C, 5B and 5C, in the optical condenser systems of the second to fourth embodiments, aberrations are well corrected and also the fθ characteristics are excellent.

Thus in the optical condenser system of these embodiments, a plastic lens (the first lens) and a glass lens (the second lens) are combined and the refracting power of the plastic lens is limited in the range defined by formula (5). Accordingly the ratio of the thickness of the central portion to that of the peripheral portion of the plastic lens need not be so large, whereby the processability can be improved and at the same time change of the position of the focus with change in environmental temperature and the like can be suppressed.

Further, by limiting the axial surface separations between the deflecting point and the first lens and between the first and second lenses to the ranges defined by formulae (1) and (2), the size of the optical condenser system in the direction of the optical axis can be kept small, whereby the overall size of the light scanning apparatus can be small.

Figure 6C:
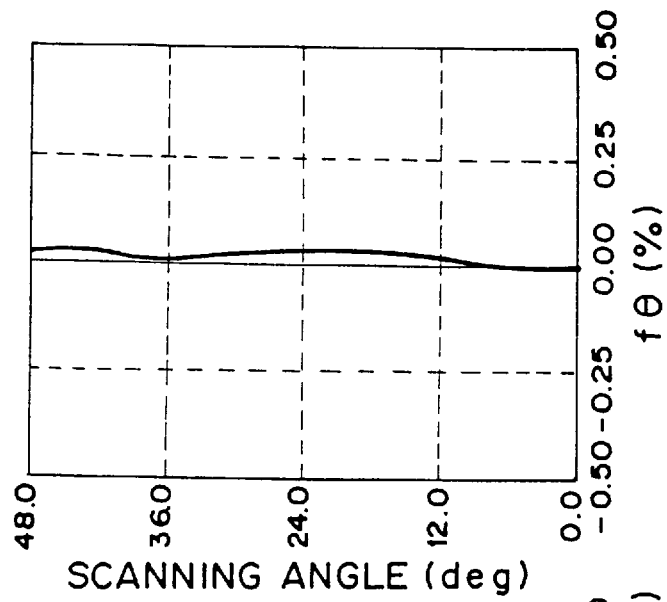
FIG. 6C is a graph showing the fθ characteristics of the optical condenser system of the fifth embodiment.
Figure 6B:
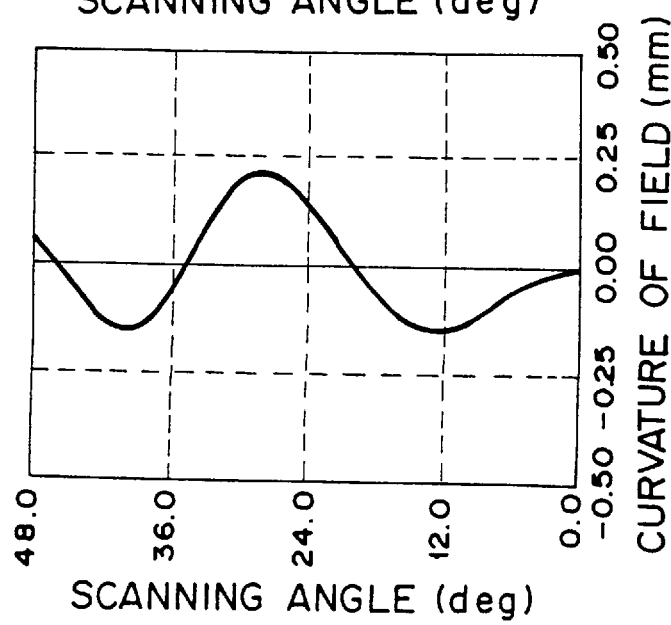
FIG. 6B is a graph showing the curvature of field of the optical condenser system of the fifth embodiment.
Figure 6A:
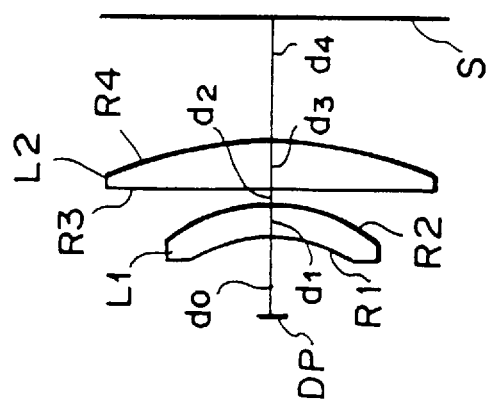
FIG. 6A is a schematic view showing the arrangement of the optical condenser system in accordance with a fifth embodiment of the present invention.

In the optical condenser system of the fifth embodiment shown in table 5 and FIG. 6A, the value of $d_0$ is set close to the lower limit of the range defined by formula (1), the value of $a_1$ is set close to the lower limit of the range defined by formula (3) and the value of $a_2$ is set close to the upper limit of the range defined by formula (4).

TABLE 5

| curvature | surface separation | refractive index |
| --- | --- | --- |
| R1 = −42.853* | $d_0$ = 11.903 | |
| K = 1.4176 | | |
| $a_1$ = −8.964 × $10^{-5}$ | | |
| $a_2$ = 2.052 × $10^{-7}$ | | |
| $a_3$ = −9.821 × $10^{-11}$ | | |
| $a_4$ = 5.318 × $10^{-13}$ | $d_1$ = 4.761 | $n_1$ = 1.53029 |
| R2 = −43.963* | | |
| K = 2.4704 | | |
| $a_1$ = −4.452 × $10^{-5}$ | | |
| $a_2$ = 7.873 × $10^{-8}$ | | |
| $a_3$ = −1.678 × $10^{-10}$ | | |
| | $d_2$ = 2.381 | |
| $a_4$ = 4.265 × $10^{-13}$ | | |
| R3 = ∞ | | |
| | $d_3$ = 7.142 | $n_2$ = 1.62004 |
| $R_4$ = −64.756 | | |
| | $d_4$ = 103.732 | |
| f = 100 mm | | angle of view = 96° |
| $f_1$ = 6719.99 mm | | |
| curvature of field = 0.37 mm | | |
| fθ = 0.03% | | |

As can be understood from FIGS. 6B and 6C, in the optical condenser system of this embodiment, aberrations are well corrected and also the fθ characteristics are excellent.

Thus in the optical condenser system of this embodiment, a plastic lens (the first lens) and a glass lens (the second lens) are combined and the refracting power of the plastic lens is limited in the range defined by formula (5). Accordingly the ratio of the thickness of the central portion to that of the peripheral portion of the plastic lens need not be so large, whereby the processability can be improved and at the same time change of the position of the focus with change in environmental temperature and the like can be suppressed.

Further, by limiting the axial surface separations between the deflecting point and the first lens and between the first and second lenses to the ranges defined by formulae (1) and (2), the size of the optical condenser system in the direction of the optical axis can be kept small, whereby the overall size of the light scanning apparatus can be small.

In the optical condenser system of the sixth embodiment shown in table 6 and FIG. 7A, the value of $d_0$ is set close to the upper limit of the range defined by formula (1), the value of $d_2$ is set close to the lower limit of the range defined by formula (2) and the value of $a_2$ is set close to the lower limit of the range defined by formula (4).

TABLE 6

| curvature | surface separation | refractive index |
|---|---|---|
| R1 = −72.303* | $d_0$ = 23.767 | |
| K = −1.0715 | | |
| $a_1$ = −7.871 × $10^{-6}$ | | |
| $a_2$ = 1.534 × $10^{-8}$ | | |
| $a_3$ = −8.586 × $10^{-12}$ | | |
| $a_4$ = 2.735 × $10^{-15}$ | $d_1$ = 7.130 | $n_1$ = 1.53029 |
| R2 = −71.044* | | |
| K = 1.2965 | | |
| $a_1$ = −3.730 × $10^{-6}$ | | |
| $a_2$ = 5.597 × $10^{-9}$ | | |
| $a_3$ = −6.179 × $10^{-13}$ | | |
| | $d_2$ = 2.377 | |
| $a_4$ = 3.946 × $10^{-17}$ | | |
| R3 = ∞ | | |
| | $d_3$ = 16.637 | $n_2$ = 1.62004 |
| $R_4$ = −65.802 | | |
| | $d_4$ = 102.919 | |
| f = 100 mm | | angle of view = 96° |
| $f_1$ = 2622.48 mm | | |
| curvature of field = 0.34 mm | | |
| fθ = 0.16% | | |

As can be understood from FIGS. 7B and 7C, in the optical condenser system of this embodiment, aberrations are well corrected and also the fθ characteristics are excellent.

Thus in the optical condenser system of this embodiment, a plastic lens (the first lens) and a glass lens (the second lens) are combined and the refracting power of the plastic lens is limited in the range defined by formula (5). Accordingly the ratio of the thickness of the central portion to that of the peripheral portion of the plastic lens need not be so large, whereby the processability can be improved and at the same time change of the position of the focus with change in environmental temperature and the like can be suppressed.

Further, by limiting the axial surface separations between the deflecting point and the first lens and between the first and second lenses to the ranges defined by formulae (1) and (2), the size of the optical condenser system in the direction of the optical axis can be kept small, whereby the overall size of the light scanning apparatus can be small.

In the optical condenser system of the seventh embodiment shown in table 7 and FIG. 8A, the value of $d_2$ is set close to the upper limit of the range defined by formula (2) and the value of $a_1$ is set close to the upper limit of the range defined by formula (3).

TABLE 7

| curvature | surface separation | refractive index |
|---|---|---|
| R1 = −51.623* | $d_0$ = 15.659 | |
| K = −1.0715 | | |
| $a_1$ = −1.129 × $10^{-5}$ | | |
| $a_2$ = 2.450 × $10^{-8}$ | | |
| $a_3$ = 6.539 × $10^{-12}$ | | |
| $a_4$ = −1.546 × $10^{-14}$ | $d_1$ = 7.140 | $n_1$ = 1.53029 |
| R2 = −43.015* | | |
| K = 1.2965 | | |
| $a_1$ = −3.401 × $10^{-6}$ | | |
| $a_2$ = 6.244 × $10^{-9}$ | | |
| $a_3$ = 2.787 × $10^{-12}$ | | |
| | $d_2$ = 11.900 | |
| $a_4$ = 1.431 × $10^{-14}$ | | |
| R3 = ∞ | | |
| | $d_3$ = 14.279 | $n_2$ = 1.62004 |
| $R_4$ = −82.837 | | |
| | $d_4$ = 99.325 | |

TABLE 7-continued

| f = 100 mm | angle of view = 96° |
|---|---|
| $f_1$ = 380.78 mm | |
| curvature of field = 0.18 mm | |
| fθ = 0.01% | |

As can be understood from FIGS. 8B and 8C, in the optical condenser system of this embodiment, aberrations are well corrected and also the fθ characteristics are excellent.

Thus in the optical condenser system of this embodiment, a plastic lens (the first lens) and a glass lens (the second lens) are combined and the refracting power of the plastic lens is limited in the range defined by formula (5). Accordingly the ratio of the thickness of the central portion to that of the peripheral portion of the plastic lens need not be so large, whereby the processability can be improved and at the same time change of the position of the focus with change in environmental temperature and the like can be suppressed.

Further, by limiting the axial surface separations between the deflecting point and the first lens and between the first and second lenses to the ranges defined by formulae (1) and (2), the size of the optical condenser system in the direction of the optical axis can be kept small, whereby the overall size of the light scanning apparatus can be small.

In the optical condenser system of the eighth embodiment shown in table 8 and FIG. 9A, the value of $1/f_1$ is set close to the lower limit of the range defined by formula (5).

TABLE 8

| curvature | surface separation | refractive index |
|---|---|---|
| R1 = −50.354* | $d_0$ = 16.665 | |
| K = 0.3186 | | |
| $a_1$ = −1.820 × $10^{-5}$ | | |
| $a_2$ = 3.438 × $10^{-8}$ | | |
| $a_3$ = 1.126 × $10^{-10}$ | | |
| $a_4$ = −2.151 × $10^{-13}$ | $d_1$ = 5.714 | $n_1$ = 1.53029 |
| R2 = −70.959* | | |
| K = 5.2367 | | |
| $a_1$ = −7.629 × $10^{-6}$ | | |
| $a_2$ = 1.724 × $10^{-8}$ | | |
| $a_3$ = 1.652 × $10^{-11}$ | | |
| | $d_2$ = 2.381 | |
| $a_4$ = −2.077 × $10^{-14}$ | | |
| R3 = ∞ | | |
| | $d_3$ = 14.284 | $n_2$ = 1.62004 |
| $R_4$ = −51.621 | | |
| | $d_4$ = 106.999 | |
| f = 100 mm | | angle of view = 96° |
| $f_1$ = −364.02 mm | | |
| curvature of field = 0.24 mm | | |
| fθ = 0.04% | | |

As can be understood from FIGS. 9B and 9C, in the optical condenser system of this embodiment, aberrations are well corrected and also the fθ characteristics are excellent.

Thus in the optical condenser system of this embodiment, a plastic lens (the first lens) and a glass lens (the second lens) are combined and the refracting power of the plastic lens is limited in the range defined by formula (5). Accordingly the ratio of the thickness of the central portion to that of the peripheral portion of the plastic lens need not be so large, whereby the processability can be improved and at the same time change of the position of the focus with change in environmental temperature and the like can be suppressed.

Further, by limiting the axial surface separations between the deflecting point and the first lens and between the first and second lenses to the ranges defined by formulae (1) and (2), the size of the optical condenser system in the direction of the optical axis can be kept small, whereby the overall size of the light scanning apparatus can be small.

The curvature of field of the first to eighth embodiments of the present invention shown in FIGS. 2A, 3B, 4B, 5B, 6B, 7B, 8B and 9B are obtained without taking into account in-and-out movement of the deflecting surfaces of the polygonal mirror 13 for the purpose of simplicity, and accordingly, curvature of field of each embodiment for the negative scanning angle range is symmetric to the graph shown in each of the figures about the line of 0° though not shown.

What is claimed is:

1. An optical condenser system for a light scanning apparatus for focusing a light bundle deflected by a deflector on a predetermined scanning surface and causing the light bundle to scan the scanning surface at a constant speed comprising a first lens consisting of a single lens formed of plastic, the single lens being concave toward the deflector and each side of the single lens being an aspheric surface defined by the following formula (6), and a second lens consisting of a plano-convex lens which is formed of glass and is convex toward the scanning surface in a cross-section taken along a plane along which the light bundle passing through the second lens is moved as a result of deflection by the deflector, the first and second lens satisfying the following formulae (1) to (5)

$$0.1f \leq d_0 \leq 0.3f \tag{1}$$

$$0.02f \leq d_2 \leq 0.2f \tag{2}$$

$$-1.0 \times 10^2/f^3 \leq a_1 \leq -1.0/f^3 \tag{3}$$

$$5.0 \times 10/f^5 \leq a_2 \leq 5.0 \times 10^3/f^5 \tag{4}$$

$$-0.3/f \leq 1/f_1 \leq 0.3f \tag{5}$$

$$z = ch^2/[1 + \{1-(1+K)c^2h^2\}^{1/2}] + a_1 h^4 + a_2 h^6 + a_3 h^8 + a_4 h^{10} \tag{6}$$

wherein f represents the focal length (mm) of the whole system, $d_0$ represents the axial surface separation (mm) between the deflecting point at the deflector and the first lens, $d_2$ represents the axial surface separation (mm) between the first lens and the second lens, $f_1$ represents the focal length (mm) of the first lens, $a_1$ to $a_4$ respectively represent fourth-degree, sixth-degree, eighth-degree and tenth-degree aspheric coefficients, z represents the sag of the surface parallel to the z-axis, h represents the height above the optical axis, c represents the curvature at the pole of the surface, K represents a conic constant.

* * * * *